United States Patent [19]

Yoshida et al.

[11] Patent Number: 5,062,075
[45] Date of Patent: Oct. 29, 1991

[54] MICROCOMPUTER HAVING SECURITY MEMORY USING TEST AND DESTRUCTION ROUTINES

[75] Inventors: Tomoaki Yoshida; Kouji Tanagawa, both of Tokyo, Japan

[73] Assignee: Oki Electric Industry Co., Ltd., Tokyo, Japan

[21] Appl. No.: 449,050

[22] Filed: Dec. 14, 1989

Related U.S. Application Data

[63] Continuation of Ser. No. 117,846, Nov. 9, 1987, abandoned.

[30] Foreign Application Priority Data

Nov. 7, 1986 [JP] Japan ................................. 61-265375

[51] Int. Cl.$^5$ .............................................. G06F 12/14
[52] U.S. Cl. .................................. 364/900; 364/965; 364/969; 364/969.4; 364/969.3; 364/921.8; 371/21.1
[58] Field of Search .................... 371/10, 21, 10.1, 12, 371/13, 21.1, 21.2, 22.6; 364/200 MS File, 900 MS File

[56] References Cited

U.S. PATENT DOCUMENTS

| | | | |
|---|---|---|---|
| 3,405,394 | 10/1968 | Dirac | 340/172.5 |
| 4,183,085 | 1/1980 | Roberts et al. | 364/200 |
| 4,430,709 | 2/1984 | Schleupen | 364/200 |
| 4,513,389 | 4/1985 | Devchoudhury | 364/900 |
| 4,521,852 | 6/1985 | Guttag | 364/200 |
| 4,521,853 | 6/1985 | Guttag | 364/200 |
| 4,590,552 | 5/1986 | Guttag et al. | 364/200 |
| 4,777,586 | 10/1988 | Matsubara et al. | 364/200 |
| 4,905,142 | 2/1990 | Matsubara et al. | 364/200 |

FOREIGN PATENT DOCUMENTS 153240 9/1984 Japan .
2092338A 8/1982 United Kingdom .

Primary Examiner—Gareth D. Shaw
Assistant Examiner—Kevin A. Kriess
Attorney, Agent, or Firm—Spencer & Frank

[57] ABSTRACT

In a single-chip microcomputer having a first memory storing security data and a second memory for storing a test program. The test program includes test routines and a destruction routine to be executed prior to the test routines. The destruction routine destroys the security data in the first memory.

10 Claims, 2 Drawing Sheets

MICROCOMPUTER HAVING SECURITY MEMORY USING TEST AND DESTRUCTION ROUTINES

This application is a continuation of application Ser. No. 07/117,846, filed Nov. 9th, 1987, now abandoned.

BACKGROUND OF THE INVENTION

The present invention relates to a single-chip microcomputer, and particularly to preservation of security of information for such a microcomputer.

A single-chip microcomputer comprises a CPU (central processing unit) comprising a control section, an ALU (arithmetic logic unit) and registers; a storage unit comprising a ROM (read-only memory) and a RAM (a read-write memory), and an I/O device (input/output device), which are all incorporated in a single chip of as an integrated circuit.

In a microcomputer used in an IC card (microchip card), an EEPROM (electrically erasable and programmable ROM) is used as part of a storage unit and is used for storing data, such as personal information, that should be kept secret. The contents of the EEPROM should not be divulged to outside parties. But during testing in the process of manufacture of the IC card, the EEPROM must permit reading of its contents. Accordingly, the capability of reading the contents of the EEPROM is essential at least until the tests are completed. To satisfy these contradictory conditions, a special mode, called the test mode, is provided in which tests on the EEPROM and other components are performed, and when the tests are completed, the microcomputer is changed into a state where the tests can no longer be performed. This is achieved for example by blowing a fuse forming part of the electrical circuit of the microcomputer.

The above arrangement is disadvantageous in that blowing a fuse requires a high energy and a special process. Moreover, once the microcomputer has been changed by blowing a fuse to a state where the tests cannot be performed, it cannot be returned into the original state, so that further tests or program analysis cannot be performed.

SUMMARY OF THE INVENTION

An object of the invention is to provide a microcomputer with which security of information can be ensured without requiring blowing a fuse and which permits repeated tests.

According to the invention, there is provided a single-chip microcomputer comprising
means for transmitting a test mode control signal from an external source,
a test mode setting circuit activated by the test mode control signal,
a first memory storing security data, and
a second memory for storing a test program, the test program including test routines and a destruction routine to be executed prior to the test routines, the destruction routine destroying the security data in the first memory.

With the above arrangement, when the test mode circuit is activated, the contents of the second memory are read out and executed in turn. In doing this, prior to the execution of the test program proper, the routine for erasing or destroying the information in the entire area of the first memory is executed (e. g., by setting all the bits in the first memory at "0" or "1"). The outside parties conducting the testing therefore cannot read the secret information stored in the first memory even though they can use the routine (stored in the second memory) for reading the first memory. The secrecy of the security data is thus preserved and the test of the microcomputer can be repeated any number of times.

DETAILED DESCRIPTION OF THE PREFERRED EMBODIMENT

Figure 1:
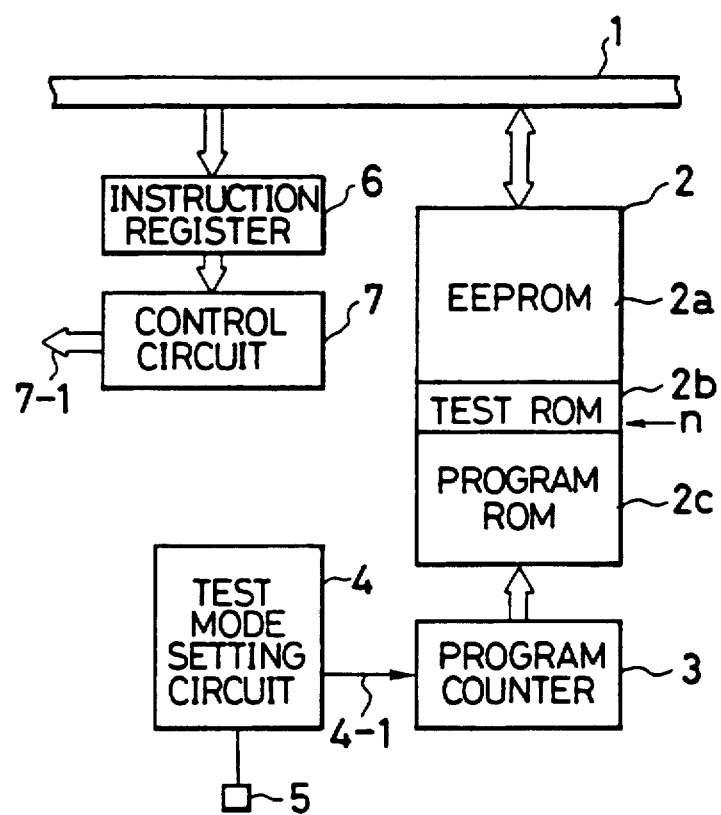
FIG. 1 is a block diagram showing part of a microcomputer according to the invention.

As shown in FIG. 1, a microcomputer of a preferred embodiment of the invention includes an internal data bus 1, a memory 2 connected to the bus 1 to store information, and a program counter (PC) 3 connected to the memory 2 to designate the address. The memory 2 includes a first memory, e.g., an EEPROM 2a for storing security data, a second memory, e.g., a ROM 2b for storing test programs used for testing the microcomputer, and a program memory, such as a ROM 2c for storing other programs used for operation of the microcomputer.

Connected to the program counter 3 is a test mode setting circuit 4 which generates an address setting control signal 4-1 at the time of initiation of a test mode. Connected to the test mode setting circuit 4 is a test mode setting means, such as a test mode input terminal 5 used for externally the test mode. In FIG. 1, the first address of the test program stored in the test ROM 2b is indicated as "n".

An instruction register 6 is connected to the bus 1 and to a control circuit 7. The control circuit 7 which, together with the instruction register 6, constitutes a program execution means, decodes the output of the instruction register 6 and produces control signals 7-1 corresponding to the output (instruction code) from the instruction register 6. Although not illustrated, the microcomputer includes a RAM (data memory), an ALU (arithmetic logic unit), registers of a CPU (central processing unit), input/output devices, and other components.

Figure 2:
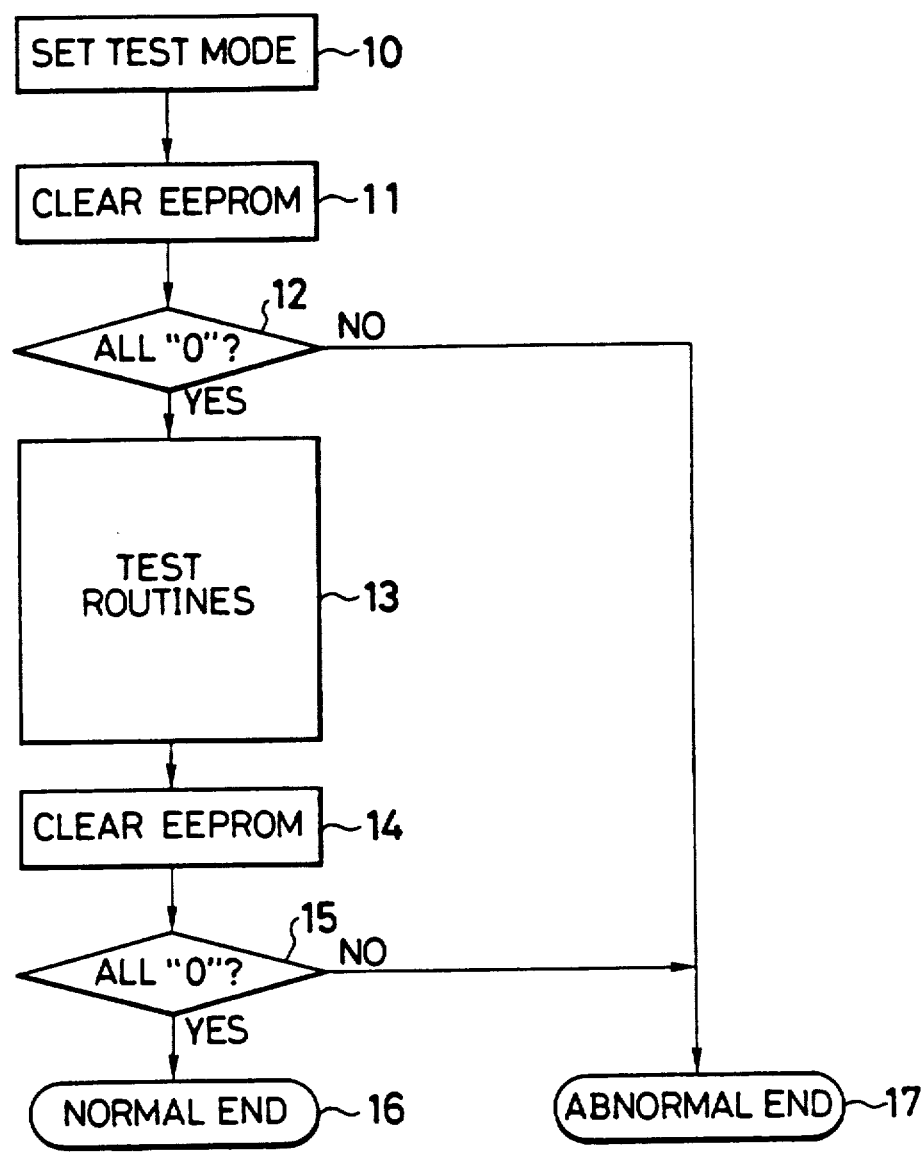
FIG. 2 is a flow chart showing a test program stored in a memory of microcomputer FIG. 1.

FIG. 2 shows a flowchart of a test program written in the test memory 2b. To enter the test mode, a control signal is externally input via the input terminal 5 to activate the test mode setting circuit 4 (Step 10). The test mode setting circuit 4 then supplies a control signal 4-1 to the program counter 3 so as to set the address "n" (at the head of the test program) in the program counter 3. The program counter 3 is thereby set at "n" and the instructions of the test program are then executed in turn starting at the address "n". That is, the instruction read out from the address "n" is first transferred via the bus 1 to the instruction register 6 and held in it. The output of the instruction register 6 is decoded at the control circuit 7, which produces the control signals 7-1 for executing the instruction. The instructions stored at the addresses "n+1", "n+2", ... are successively read out and executed.

The test program stored in the test memory 2b includes test routines 13 which form a test program proper, and destruction routines 11, 14 respectively disposed in front of and at the back of the test routines. The destruction routines 11, 14 are for destroying all the contents of the EEPROM 2a, by for example clearing (setting "0" in) all the memory locations of the EEPROM 2a. More particularly, when the test mode is entered, first the destruction routine 11 is executed by which all the memory locations of the EEPROM 2a are cleared to "0". Then, checking is performed to determine whether all the memory locations of the EEPROM 2a are at "0" (Step 12). If all the memory locations of the EEPROM 2a are not at "0", it is determined that an abnormal ending (Step 17) has been reached. If all the memory locations of the EEPROM 2a are at "0", then the test routines (Step 13) are executed. The test routines include routines for writing in the EEPROM 2a, at locations which include those occupied by the security data prior to its destruction and routines for reading from the EEPROM 2a. But as the contents of the EEPROM 2a have been destroyed before the test routines are executed, the security data which may have been stored before the test is started cannot be known to the operator carrying out the test.

After the test routines are performed, all the locations of the EEPROM 2a are cleared to "0" (Step 14), and judgement is made whether all the locations of the EEPROM 2a are at "0" (Step 15). If all the memory locations of the EEPROM 2a are not at "0" it is determined that, an abnormal ending has been reached (Step 17). If all the memory locations are at "0", a normal ending (Step 16) is reached.

The destruction routine (Step 14) is useful where data which should be kept secret remains in the EEPROM 2a after the test routines (Step 13). But where such data which should be kept secret does not remain in the EEPROM 2a, the destruction routine 14 which takes place after the test routines 13, as well as the accompanying judging routine (15), can be omitted.

Instead of clearing all the memory locations in the EEPROM 2a to "0", they can be set at the hexadecimal value "FF". Alternatively, they can be filled with any arbitrary values which are not related to any security data. For example, the memory locations are can be filled with the successively increasing numbers "0", "1", "2", "3", etc.

In the above embodiment, the test program has two exits, "normal ending" and "abnormal ending". But a single exit can be shared if in the case of abnormality, this condition is written in a RAM.

After the test, security data can be written in the EEPROM 2a. This is done normally at a different site using a different machine.

It will now be apparent that the contents of the EEPROM 2a are destroyed before entry of the test routines, i.e., before the EEPROM 2a is accessed during the execution of the test program proper. Accordingly, even if a third party attempts to read the contents of the EEPROM 2a using a reading routine stored in the test memory 2b, such attempt will fail. Moreover, as opposed to the prior art arrangement, the microcomputer is not changed into a state where the test cannot be made, and the test can be repeated after use of the microcomputer, e.g., when it is part of an IC card, for program analysis or the like.

What is claimed is:

1. A microcomputer, comprising:
   a test mode setting circuit including means for receiving an external test mode control signal, said test mode setting circuit generating an address setting control signal upon receipt of said test mode control signal; and
   memory means coupled to said test mode setting circuit, said memory means including
   a first memory having storage locations therein for storing security information, and
   a second memory having stored therein a test program for execution by a program executing means coupled to said memory means, said test program including a test routine and a first destruction routine, said test program including instructions to the program executing means to erase the security information stored in said first memory in accordance with said first destruction routine when said address setting control signal is received by said memory means, and then to run said test routine to test said storage locations.

2. A microcomputer according to claim 1, wherein the microcomputer is formed on a single chip.

3. A microcomputer according to claim 1, wherein said first destruction routine instructs the program executing means to set all of said storage locations at a predetermined value.

4. A microcomputer according to claim 1, wherein said test program includes a second destruction routine which instructs the program executing means to erase any information stored in said storage locations after the program executing means runs said test routine.

5. A microcomputer according to claim 4, wherein said first destruction routine instructs the program executing means to set all of said storage locations at a predetermined value.

6. A microcomputer, comprising:
   a test mode setting circuit including means for receiving an external test mode control signal, said test mode setting circuit generating an address setting control signal upon receipt of said test mode control signal;
   memory means coupled to said test mode setting circuit, said memory means including
   a first memory having storage locations therein for storing security information, and
   a second memory having stored therein a test routine and a first destruction routine; and
   program executing means coupled to said memory means, said program executing means erasing the security information stored in said first memory in accordance with said destruction routine when said address setting control signal is received by said memory means, said program executing means then running said test routine to test said storage locations.

7. A microcomputer according to claim 6, wherein the microcomputer is formed on a single chip.

8. A microcomputer according to claim 6, wherein said first destruction routine instructs said program executing means to set all of said storage locations at a predetermined value.

9. A microcomputer according to claim 6, wherein said test program includes a second destruction routine which instructs said program executing means to erase any information stored in said storage locations after said program executing means runs said test routine.

10. A microcomputer according to claim 9, wherein said first destruction routine instructs said program executing means to set all of said storage locations at a predetermined value.

* * * * *